(12) United States Patent
Peng et al.

(10) Patent No.: US 11,183,848 B2
(45) Date of Patent: Nov. 23, 2021

(54) VOLTAGE COOPERATIVE CONTROL METHOD FOR AC/DC DISTRIBUTION SYSTEM AND AN AC/DC DISTRIBUTION SYSTEM

(71) Applicant: Shandong University of Technology, Shandong (CN)

(72) Inventors: Ke Peng, Shandong (CN); Xinhui Zhang, Shandong (CN); Xueshen Zhao, Shandong (CN); Jiajia Chen, Shandong (CN); Bingyin Xu, Shandong (CN)

(73) Assignee: SHANDONG UNIVERSITY OF TECHNOLOGY, Shandong (CN)

( * ) Notice: Subject to any disclaimer, the term of this patent is extended or adjusted under 35 U.S.C. 154(b) by 0 days.

(21) Appl. No.: 16/821,333

(22) Filed: Mar. 17, 2020

(65) Prior Publication Data
US 2021/0098990 A1    Apr. 1, 2021

(30) Foreign Application Priority Data
Sep. 29, 2019    (CN) .......................... 201910931193.5

(51) Int. Cl.
*H02J 3/32*    (2006.01)
*H02M 7/217*    (2006.01)
*H02J 3/38*    (2006.01)

(52) U.S. Cl.
CPC ............... *H02J 3/32* (2013.01); *H02M 7/217* (2013.01); *H02J 3/381* (2013.01); *H02J 2300/24* (2020.01)

(58) Field of Classification Search
CPC .......... H02J 3/32; H02J 2300/24; H02J 3/381; H02J 13/0006; H02J 3/322; H02J 3/383; H02M 7/217
See application file for complete search history.

(56) References Cited

U.S. PATENT DOCUMENTS

| | | | |
|---|---|---|---|
| 10,432,082 B1* | 10/2019 | Sharifipour | H02J 1/00 |
| 2016/0094037 A1* | 3/2016 | Eren | H02M 7/53875 |
| | | | 363/95 |
| 2020/0293703 A1* | 9/2020 | Gu | H02J 3/50 |

FOREIGN PATENT DOCUMENTS

CN    110649642 A    1/2020

OTHER PUBLICATIONS

Zhao et al.,"Droop Control Method for Flexible DC Distribution System Based on Feed Forward Compensation", Automation of Electric Power Systems, vol. 42, No. 15, Aug. 10, 2018, 20 pages.

(Continued)

*Primary Examiner* — Metasebia T Retebo
(74) *Attorney, Agent, or Firm* — Workman Nydegger (57) ABSTRACT

Disclosed herewith is a voltage coordinated control method for an AC/DC distribution system, including steps of: acquiring an actual voltage and an actual current at a DC-side of a converter of the system to obtain a first DC voltage and a first DC current; generating a present reference current signal for the converter according to a voltage-current droop control model, and generating a first control signal to control an output state of the converter; and acquiring an actual voltage at a DC-side of an energy storage adapter in the system to obtain a second DC voltage, generating a present reference power signal for the adapter according to a voltage-power droop control model, and generating a second control signal to control an output state of the adapter.

10 Claims, 7 Drawing Sheets

(56) References Cited

OTHER PUBLICATIONS

Meng et al., "Research on Hierarchical Control in AC/DC Distribution Network on the Basis of Optimal Power Flow", School of Electrical and Electronic Engineering, North China Electric Power University, vol. 39, No. 8, Aug. 31, 2018, 8 pages.

* cited by examiner

VOLTAGE COOPERATIVE CONTROL METHOD FOR AC/DC DISTRIBUTION SYSTEM AND AN AC/DC DISTRIBUTION SYSTEM

TECHNICAL FIELD

The invention relates to the technical field of AC/DC distribution, in particular to a voltage cooperative control method for an AC/DC distribution system with integration of energy storage, and an AC/DC distribution system.

TECHNICAL BACKGROUND

With the rapid development and wide application of new energy, new materials, information technology, and power electronics technology, users' requirements for power consumption, power quality and power supply reliability continue to increase. Accordingly, existing AC distribution systems will face huge challenges in many aspects, such as integration of distributed new energy (power supply), diversified demands on load and power consumption, complicated cooperative control on power flow balance, and stability, efficiency, economics of power supply, etc.

Wind power, photovoltaic power generation, fuel cells, and various energy storage devices, such as electric vehicle power batteries and super capacitors, generally adopt DC technology, so that they must be integrated into the AC distribution system through DC-AC converters. At the same time, DC power supplies are essentially more convenient and energy-efficient for many office and household appliances.

In addition, due to the separation of urban planning from power system planning, currently urban development has led to a distribution system structure that is incompatible with the requirements on load development. Therefore, the planning, development, and quality of power supply of distribution systems are more and more unsuitable for urban development.

In short, the traditional distribution system structure its distribution/supply models have been increasingly unable to meet the requirements of the rapidly developing economy and society on environmental friendliness, safety and reliability, cost effectiveness, compatibility on integration of distributed power supply, and interaction between the user and the power grid.

The DC-based distribution system has better performances than the AC-based one in terms of transmission capacity, controllability, and power supply quality. It can effectively improve power quality, reduce use of power electronic converters, cut down power loss and operating costs, and coordinate the conflicts between large-scale power grids and distributed power sources. In this manner, values and benefits of distributed power sources can be sufficiently achieved.

However, random and frequent fluctuations in power output of distributed power sources, such as photovoltaic power generation and wind power generation, random charging requirements for electric vehicles, and frequent switching of power loads have all led to frequent power imbalances in a flexible DC distribution system. This brings great challenges on the safe and stable operation of the flexible DC distribution system, and also has a great impact on the AC distribution system.

SUMMARY OF THE INVENTION

In order to solve the above problems, the present invention proposes a voltage coordinated control method for an AC/DC distribution system with integration of energy storage, including steps of: S01, acquiring an actual voltage and an actual current at a DC-side of at least one converter of the AC/DC distribution system, so as to obtain a first DC voltage and a first DC current; S02, generating, based on the first DC voltage and the first DC current, a present reference current signal for the converter according to a voltage-current droop control model, and generating a first control signal based on said present reference current signal to control an output state of the converter; and S03, acquiring an actual voltage at a DC-side of an energy storage adapter in the AC/DC distribution system to obtain a second DC voltage, generating a present reference power signal for the energy storage adapter based on said second DC voltage according to a voltage-power droop control model, and generating a second control signal based on said present reference power signal to control an output state of the energy storage adapter.

According to an embodiment of the present invention, the step of generating a present reference current signal according to a voltage-current droop control model comprises: determining whether the first DC current is within a preset allowable range for an output current of the converter, and if so, generating a first voltage deviation signal based on the first DC voltage and a first preset reference voltage signal; performing proportional conversion on the first voltage deviation signal to obtain a second voltage deviation signal; and updating a preset reference current signal for the converter based on said second deviation signal to obtain said present reference current signal.

According to an embodiment of the present invention, if the first DC current is greater than or equal to a maximum value of the preset allowable range for the output current of the converter, said maximum value of the preset allowable range for the output current of the converter is used as said present reference current signal; and if the first DC current is less than or equal to a minimum value of the preset allowable range for the output current of the converter, said minimum value of the preset allowable range for the output current of the converter is used as said present reference current signal.

According to an embodiment of the present invention, in the voltage-current droop control model there exists:

$$I'_{dcref} = \begin{cases} I_{dcmin} & I_{dc} \leq I_{dcmin} \\ I_{dcref} + k(U_{dcref} - U_{dc}) & I_{dcmin} < I_{dc} < I_{dcmax} \\ I_{dcmax} & I_{dc} \geq I_{dcmax}, \end{cases}$$

wherein: $I'_{dcref}$ indicates the present reference current signal; $I_{dcmax}$ and $I_{dcmin}$ indicate the maximum and minimum values of the preset allowable range for the output current of the converter, respectively; $I_{dcref}$ indicates the preset reference current signal of the converter; k indicates a proportional coefficient of a proportional controller; $U_{dc}$ indicates the first DC voltage; $I_{dc}$ represents the first DC current; and $U_{dref}$ represents the first preset reference voltage signal.

According to an embodiment of the present invention, the step of generating a present reference power signal according to a voltage-power droop control model comprises: determining whether the second DC voltage is within a preset DC voltage allowable range of the energy storage adapter, and if so, using a preset reference output power signal for the energy storage adapter as the present reference power signal.

According to an embodiment of the present invention, if the second DC voltage is out of the preset DC voltage allowable range of the energy storage adapter, then: generating a third voltage deviation signal based on the second DC voltage and a preset reference DC voltage signal of a DC micro-grid adapter; generating an output power deviation signal based on said third voltage deviation signal with a PID controller; and updating the preset reference output power signal of the energy storage adapter based on said output power deviation signal to obtain the present reference power signal.

According to an embodiment of the present invention, in the voltage-power droop control model, there exists:

$$P'_{ref} = \begin{cases} \left(K + \dfrac{K_i}{s} + K_d s\right)(U'_{dcref} - U'_{dc}) + P_{ref} & U'_{dc} \leq U_1 \\ P_{ref} & U_1 < U'_{dc} < U_2 \\ \left(K + \dfrac{K_i}{s} + K_d s\right)(U'_{dcref} - U'_{dc}) + P_{ref} & U_2 \leq U'_{dc}, \end{cases}$$

wherein: $P'_{ref}$ represents the present reference power signal; $K$, $K_i$, and $K_d$ represent a proportional coefficient, an integral coefficient, and a differential coefficient of the PID controller, respectively; $U'_{dc}$ represents the second DC voltage; $U'_{dcref}$ represents the preset reference DC voltage of the energy storage adapter; $P_{ref}$ represents the preset reference output power of the energy storage adapter; and $U_1$ and $U_2$ represent the minimum and maximum values of the preset DC voltage range of the energy storage adapter, respectively.

According to an embodiment of the present invention, said second control signal includes a duty cycle signal for the energy storage adapter, and in S03 the duty cycle signal for the energy storage adapter is generated based on the present reference power signal with a dual closed-loop control logic consisting of a voltage outer loop and a current inner loop.

According to an embodiment of the present invention, the first control signal includes a modulated signal for the converter, and in S02 the modulated signal for the converter is generated based on the present reference current signal with a dual closed-loop control logic consisting of a voltage outer loop and a current inner loop.

The present invention further proposes an AC/DC distribution system, comprising: a plurality of converters, a DC end of each being connected with a DC distribution network bus and an AC end thereof being connected with an AC distribution network bus; a plurality of adapters, one end of each being connected with the DC distribution network bus and the other end of each being connected with an adjustable power source; and an AC/DC distribution control device, which is connected to the converters and the adapters, and configured to control operation states of the converters and the adapters with the method according to claim 1.

The AC/DC distribution method for the AC/DC distribution system with integration of energy storage according to the present invention is a control method based on hierarchical control strategy, which includes a primary voltage regulation and a secondary voltage regulation. The primary voltage regulation is undertaken by flexible devices under the voltage-current droop control mode, so as to achieve the following purposes. On the one hand, various flexible devices are coordinated according to voltage-current droop control characteristics in a balanced manner, thus fully playing individual voltage regulation capabilities to enhance the DC voltage controllability. On the other hand, the burden on the voltage regulation of the battery energy storage device can be relieved, thus suppressing frequent charging/discharging of the battery energy storage device to prolong the service life thereof.

Through analysis it is found that although the primary voltage regulation can provide real time response, the output of various flexible devices is insufficient to meet the requirement on the system power when the power imbalance of the DC distribution system is harsh, and in the meantime the DC voltage suffers a large fluctuation. In this case, it is necessary to use the battery energy storage device to perform the secondary voltage regulation on the system, in order to compensate for the power imbalance of the flexible DC distribution system to adjust the DC voltage to the allowable range.

Specifically, in an embodiment, the secondary voltage regulation is performed by the battery energy storage device under the voltage-power droop control mode. The secondary voltage regulation can better meet the requirements on the power of the flexible DC distribution system, so that the DC voltage can be restored to a stable working area after the secondary voltage regulation. Meanwhile, the secondary voltage regulation can also enhance the system damping, increase the dynamic adjustment speed of the system, and improve stability thereof. In addition, the secondary voltage regulation can also reduce the change in the exchanging power of the AC/DC distribution system before and after disturbances, i.e., reduce the impact of integration of the flexible DC distribution system on the AC distribution system.

Other features and advantages of the present invention will be explained in the following description, and partly become apparent from the description, or be understood by implementing the present invention. The objects and other advantages of the present invention can be achieved and obtained by the structures specifically pointed out in the description, the claims, and the drawings.

BRIEF DESCRIPTION OF THE DRAWINGS

In order to more clearly explain the embodiments of the present invention or the technical solutions in the prior art, the drawings that are necessary for illustrating the embodiments of the present invention or the prior art will be briefly described as follows.

DETAILED DESCRIPTION OF THE INVENTION

In the following the embodiments of the present invention will be described in detail with reference to the accompanying drawings and examples, so that the procedure of how the present invention solves technical problems with technical means and achieves corresponding technical effects can be understood and implemented. The embodiments of the present application and various features in the embodiments can be combined with each other if there are no conflicts, and the technical solutions formed by such combinations all fall within the scope of protection of the present invention.

Meanwhile, in the following many specific details are set forth for the purpose of explanation to provide a thorough understanding on the embodiments of the present invention. However, it will be apparent to those skilled in the art that the present invention may be implemented without the specific details or manners described herein.

In addition, the steps shown in the flow chart of the figures may be performed in a computer system including a set of computer executable instructions, for example. And, although a logical order is shown in the flow chart, in some cases the steps as shown or described may be performed in a different order than here.

The flexible DC distribution system is interconnected with the AC distribution system through flexible devices, wherein master-slave control and peer-to-peer control are mainly adopted to ensure stable operation of the system. Although the master-slave control can realize zero-error adjustment of the voltage for the flexible DC distribution system, the master flexible device has to be configured with a large capacity, and the random and frequent changes in the output power of the master flexible device will negatively influence on the safe and stable operation of the AC distribution system greatly. Droop control is a typical applicable mode of peer-to-peer control, which can coordinate the power output of various flexible devices, and also suppress the DC voltage fluctuation caused by power imbalance of the system. However, the existing droop control has the disadvantages of large DC voltage fluctuations, weak system damping or the like. Therefore, it is necessary to provide energy storage devices to compensate for power imbalance of the DC distribution system.

Power imbalance occurs frequently in the flexible DC distribution system, thus bringing great challenges to its safe and stable operation. In order to solve the problems, such as poor voltage stability, difficult control or the like, of the flexible DC distribution system, reduce the impact of integration of the flexible DC distribution system on the AC distribution system, and suppress instable operation of the system caused by changes in the DC line parameters, the AC interconnection strength, and the outer loop control parameters, the present invention proposes an AC/DC distribution method, and an AC/DC distribution system that performs the AC/DC distribution control with the above method. The method is a voltage cooperative control method for the AC/DC distribution system with integration of energy storage, which can, on the basis of a primary voltage regulation achieved by the droop control of the flexible device, perform a secondary voltage regulation through an energy storage device based on dead zone control. Therefore, orderly and stable layered voltage control of the AC/DC distribution system can be achieved, thus effectively improving dynamic performance and steady-state performance of the AC/DC distribution system.

Figure 1:
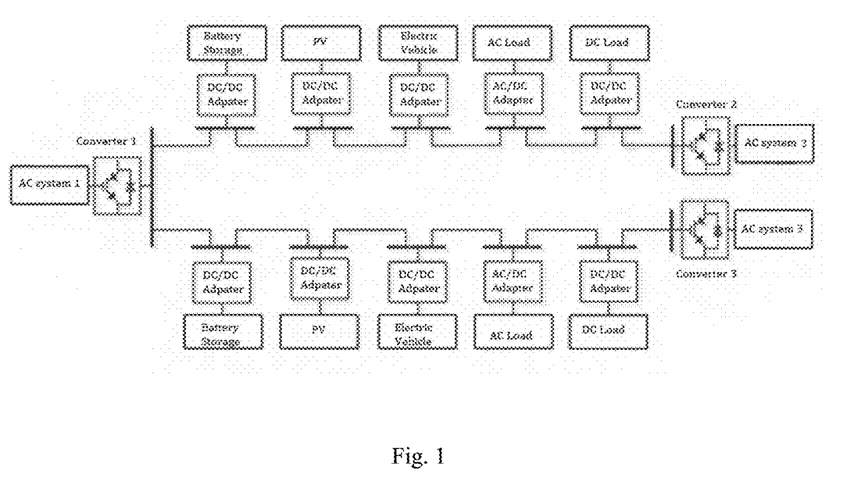
FIG. 1 schematically shows the structure of a multi-end power supply of an AC/DC distribution system according to an embodiment of the present invention.

FIG. 1 schematically shows the structure of a multi-end power supply of the AC/DC distribution system. The power supply structure has the following advantages. First, it changes the structure of the traditional AC distribution system network, so that asynchronous zone-interconnections between AC systems can be realized, which improves power supply capability and reliability. Second, it has large capacity, high reliability and strong controllability for power transmission, and is suitable for supplying power to load centers of the AC distribution system with limited capacity for expansion. Third, the DC distribution system has a flexible control operation mode and network structure, presenting outstanding advantages in aspects of complementary power generation with multiple energy sources and of flexible load compatibility. Finally, the active mode and the reactive mode are decoupled from each other and thus can be in operation independently, which enhances the power flow control capability of the system, and also provide reactive power support to the AC distribution system to improve its fault ride-through capability.

Figure 2:
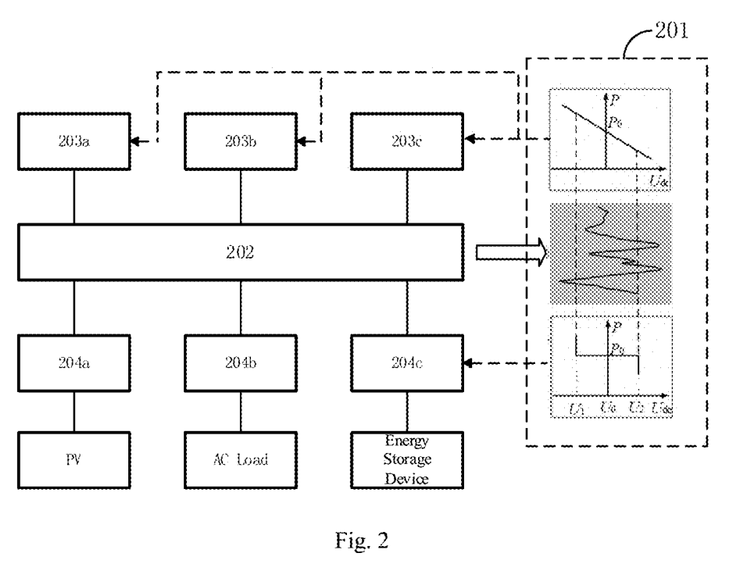
FIG. 2 schematically shows the structure of an AC/DC distribution system according to an embodiment of the present invention.
Figure 3:
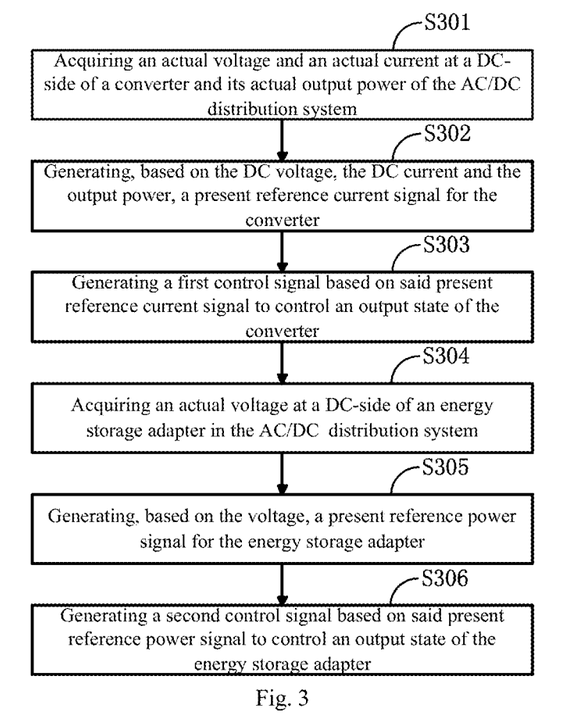
FIG. 3 is a schematic flowchart of an AC/DC distribution method according to an embodiment of the present invention.

FIG. 2 schematically shows the structure of the AC/DC distribution system according to the embodiment, and FIG. 3 is a schematic flowchart of an AC/DC distribution method implemented according to the embodiment. The principle and procedure of implementing the AC/DC distribution method will be further described below with reference to FIGS. 2 and 3.

As shown in FIG. 2, the AC/DC distribution system provided according to this embodiment preferably includes: a plurality of converters, a plurality of adapters, and an AC/DC distribution control device 201. Among others, a DC end of each of the converters (such as a first convert 203a, a second convert 203b, and a third convert 203c, etc.) is used for connection with a DC distribution network bus 202, and an AC end thereof is used for connection with an AC bus.

One end of each adapter is connected to the DC distribution network bus 202, and the other end thereof is connected to an adjustable power source. For example, as shown in FIG. 2, a first adapter 204a is used to connect a photovoltaic (PV) power generation apparatus with the DC distribution network bus 202 for DC-DC voltage conversion. A second adapter 204b is used to connect an AC load with the DC distribution network bus 202 for AC-DC voltage conversion. A third adapter 204c is used to connect an energy storage device with the DC distribution network bus 202 for DC-DC voltage conversion.

It should be noted that in different embodiments of the present invention, the numbers of converters and/or adapters included in the AC/DC distribution system can be reasonably selected according to actual needs, and the present invention is not restricted in this connection.

The AC/DC distribution control device 201 is connected to the converters and the adapters, and can control the operation state of the converters and the adapters with the AC/DC distribution method provided by the present invention. Specifically, the AC/DC distribution control device 201 can, on the basis of a primary voltage regulation through controlling the converters, perform a secondary voltage regulation through the energy storage device based on dead zone control. Therefore, orderly and stable layered voltage control of the AC/DC distribution system can be achieved.

Specifically, as shown in FIG. 3, the AC/DC distribution method in this embodiment preferably includes step S301 of acquiring an actual voltage and an actual current at the DC-side of the converters of the AC/DC distribution system, so as to obtain a first DC voltage and a first DC current.

Subsequently, the method further includes step S302 of generating, based on the first DC voltage and the first DC current obtained in step S301, a present reference current signal for the converters according to a voltage-current droop control model.

Then, the method further includes step S303 of generating a first control signal based on the present reference current signal, so as to control an output state of the converters.

Figure 4:
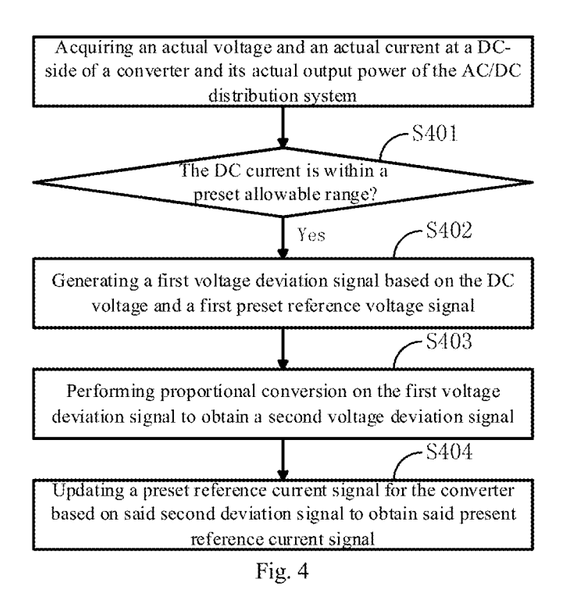
FIG. 4 is a schematic diagram of generating a present reference current signal according to an embodiment of the present invention.

Specifically, as shown in FIG. 4, in this embodiment, when the present reference current signal is generated, the method preferably includes step S401 of determining whether the first DC current is within a preset allowable range for the output current of the converters. If the first DC current is within the preset allowable range for the output current of the converters, the method further includes step S402 of generating a first voltage deviation signal based on the first DC voltage and a first preset reference voltage signal. After the first voltage deviation signal is obtained, the method preferably includes step S403 of performing proportional conversion on the first voltage deviation signal, so as to obtain a second voltage deviation signal. Finally, the method includes step S404 of updating a preset reference current signal for the converters based on the second deviation signal obtained in step S403, so as to obtain the present reference current signal.

Figure 5:
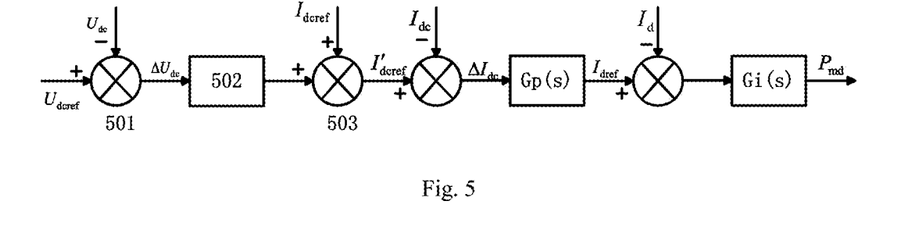
FIG. 5 is a logic diagram of a voltage-power droop control model according to an embodiment of the present invention.

As shown in FIG. 5, in this embodiment of the present method, if the first DC current $I_{dc}$ is within an allowable range $[I_{dcmin}, I_{dcmax}]$ of the preset converter output current (that is, $I_{dcmin} < I_{dc} < I_{dcmax}$), a first subtractor 501 can be used for calculating the difference between the first preset reference voltage signal $U_{dcref}$ and a first DC voltage $U_{dc}$, so as to obtain the first voltage deviation signal $\Delta U_{dc}$. That means the following equation:

$$\Delta U_{dc} = U_{dcref} - U_{dc} \quad (1)$$

According to the present method, after the first voltage deviation signal $\Delta U_{dc}$ is obtained, a first proportional controller may be used to perform proportional conversion on the first voltage deviation signal $\Delta U_{dc}$ to obtain a second voltage deviation signal. Subsequently, a first adder is used to update the preset reference current signal $I_{dcref}$ for the converters based on said second voltage deviation signal, thereby obtaining the present reference current signal $I'_{dcref}$. That means the following equation:

$$I'_{dcref} = I_{dcref} + k(U_{dcref} - U_{dc}) \quad (2)$$

According to the present method, after the present reference current signal $I'_{dcref}$ is obtained, a corresponding first control signal is generated through subsequent current closed-loop control, so as to control the output state of the converters.

In this embodiment of according to the method, if the first DC current $I_{dc}$ is greater than or equal to the maximum value $I_{dcmax}$ of the preset converter output current allowable range (that is, $I_{dc} \geq I_{dcmax}$), the maximum value $I_{dcmax}$ of the preset allowable range of the converter output current will be preferably used as the present reference current signal $I'_{dcref}$. That means the following equation:

$$I'_{dcref} = I_{dcmax} \quad (3)$$

However, according to the method, if the first DC current $I_{dc}$ is less than or equal to the minimum value $I_{dcmin}$ of the preset converter output current allowable range (that is, $I_{dc} \leq I_{dcmin}$), the minimum value $I_{dcmin}$ of the preset allowable range of the converter output current will be preferably used as the present reference current signal $I'_{dcref}$. That means the following equation:

$$I'_{dcref} = I_{dcmin} \quad (4)$$

Figure 6:
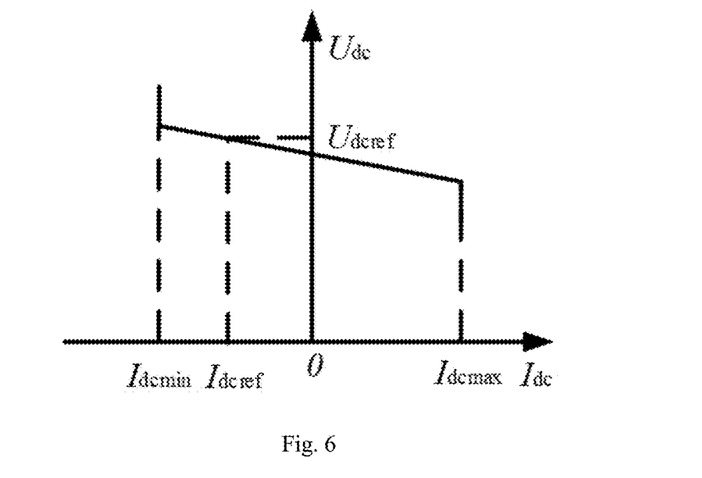
FIG. 6 schematically shows a droop curve of a voltage-current droop control model according to an embodiment of the present invention.

In this way, in the voltage-current droop control model, there exists:

$$I'_{dcref} = \begin{cases} I_{dcmin} & I_{dc} \leq I_{dcmin} \\ I_{dcref} + k(U_{dcref} - U_{dc}) & I_{dcmin} < I_{dc} < I_{dcmax} \\ I_{dcmax} & I_{dc} \geq I_{dcmax} \end{cases} \quad (5)$$

wherein: $I'_{dcref}$ indicates the present reference current signal; $I_{dcmax}$ and $I_{dcmin}$ indicate the maximum and minimum values of the preset allowable range of the output current of the converters, respectively; $I_{dcref}$ indicates the preset reference current signal of the converters; k indicates the proportional coefficient of the proportional controller; $U_{dc}$ indicates the first DC voltage; $U_{dcref}$ represents the first preset reference voltage signal; and $I_{dc}$ represents the first DC current. FIG. 6 schematically shows a droop curve of the voltage-current droop control model according to the embodiment.

Figure 7:
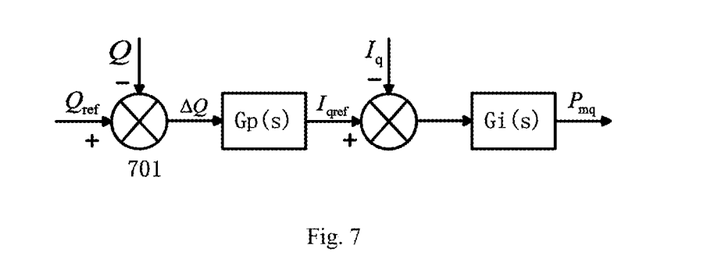
FIG. 7 is a logic diagram of reactive power control according to an embodiment of the present invention.

It should be noted that in this embodiment, the present method can also realize the control on the reactive power outputted from the converters with the above-mentioned voltage-current droop control model. Specifically, as shown in FIG. 7, in this embodiment of the present method, a reactive power Q at the AD-side of the converters can be acquired, and a second subtractor 701 is used for calculating the difference between the reactive power Q and a reference reactive power signal $Q_{ref}$, so as to obtain a reactive power deviation signal $\Delta Q$. According to the method, based on the reactive power deviation signal $\Delta Q$, a control signal can be generated through a corresponding closed-loop control, so as to control the operation state of the converters.

Of course, in other embodiments of the present invention, the voltage-current droop control model used in the present method may also be other suitable models, and the present invention is not restricted in this connection.

Figure 8:
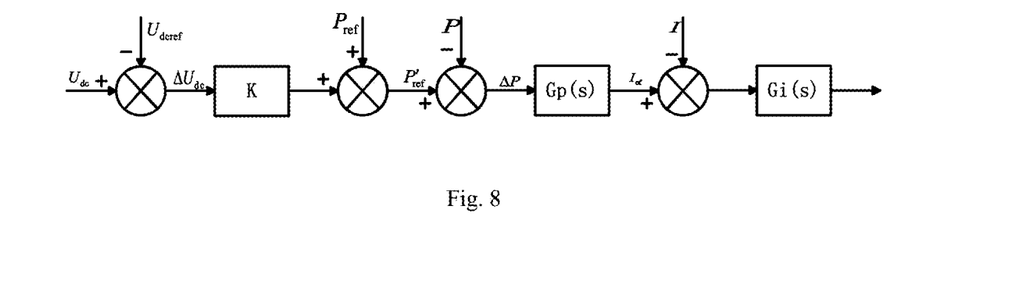
FIGS. 8 and 9 are a principle diagram and a block diagram of a conventional voltage-power droop control that is based on dead zone control, respectively.
Figure 9:
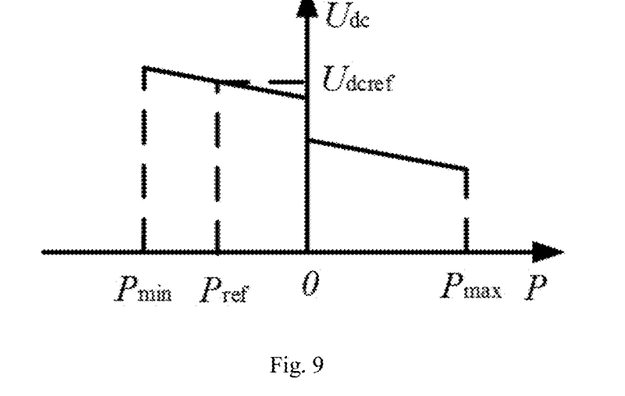

FIGS. 8 and 9 are a principle diagram and a block diagram of a voltage-power droop control, which is generally based on dead zone control, for battery energy storage in the AC/DC distribution system, respectively. In the existing voltage-power droop control model, an adder is used to calculate the difference between the actual voltage $U_{dc}$ at the DC side of a DC micro-grid adapter and its preset reference DC voltage signal $U_{dcref}$, a proportional controller is used to process the difference and then add the processed difference signal with a preset reference output power signal to obtain a new reference output power signal, and then a corresponding control signal is generated based on the new reference output power signal through closed-loop control.

Specifically, for the existing voltage-power droop control model, there exists:

$$P = \begin{cases} K(U_{dcref} - U_{dc}) + P_{ref} & U_{dc} \leq U_1 \\ P_{ref} & U_1 < U_{dc} < U_2 \\ K(U_{dcref} - U_{dc}) + P_{ref} & U_2 \leq U_{dc} \end{cases} \quad (6)$$

wherein K indicates the droop coefficient of the DC voltage.

In order to solve the problems, such as poor voltage stability, difficult control, or the like, of the flexible DC distribution system, reduce the impact of integration of the flexible DC distribution system on the AC distribution system, and suppress instable operation of the system caused by changes in the DC line parameters, the AC interconnection strength, and the outer loop control parameters, the present invention proposes a new voltage-power droop control model, by which a secondary voltage regulation can be achieved through an energy storage device with the droop control model based on dead zone control. Therefore, orderly and stable layered voltage control of the AC/DC distribution system can be achieved, thus effectively improving dynamic performance and steady-state performance of the AC/DC distribution system.

It should be noted that in this embodiment, the first control signal preferably includes a modulated signal for the converters. Preferably, a dual closed-loop control logic consisting of a voltage outer loop and a current inner loop may also be adopted to generate the modulated signal for the converters according to the present reference current signal.

Figure 10:
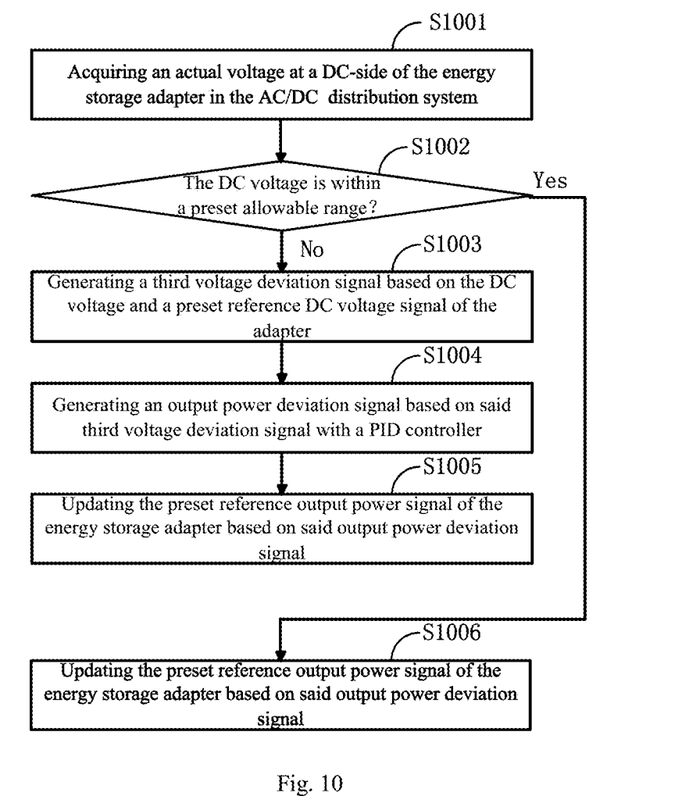
FIG. 10 is a schematic flowchart of generating a present reference power signal with the voltage-power droop control model according to an embodiment of the present invention.

FIG. 10 is a schematic flowchart of generating a present reference power signal with the voltage-power droop control model according to this embodiment.

As shown in FIG. 10, in this embodiment, the present method comprises step S1001 of acquiring an actual voltage at the DC-side of an energy storage adapter in the AC/DC distribution system, so as to obtain a second DC voltage U'$_{dc}$. Subsequently, the method further comprises step S1002 of determining whether the second DC voltage U'$_{dc}$ is within a preset DC voltage allowable range of the energy storage adapter.

If the second DC voltage U'$_{dc}$ is within the preset DC voltage allowable range [U$_1$, U$_2$] of the energy storage adapter (that is, U$_1$<U'$_{dc}$<U$_2$), the method comprises step S1006 of using the preset reference output power signal for the energy storage adapter as the present reference power signal. That is, there exists the following equation:

$$P'_{ref} = P_{ref} \quad (7)$$

wherein P'$_{ref}$ represents the present reference power signal, and P$_{ref}$ represents the preset reference output power signal of the energy storage adapter.

If the second DC voltage U'$_{dc}$ is out of the preset DC voltage range [U$_1$, U$_2$] of the energy storage adapter, the method preferably comprises step S1003 of generating a third voltage deviation signal based on said second DC voltage U'$_{dc}$ and a preset reference DC voltage signal U'$_{dcref}$ of the energy storage adapter. Subsequently, the method further preferably comprises step S1004 of generating a corresponding output power deviation signal with a PID controller based on said third voltage deviation signal, and finally step S1005 of updating the preset reference output power signal P$_{ref}$ of the DC micro-gird adapter based on the output power deviation signal obtained in step S1004, thus obtaining the present reference power signal P'$_{ref}$.

Figure 11:
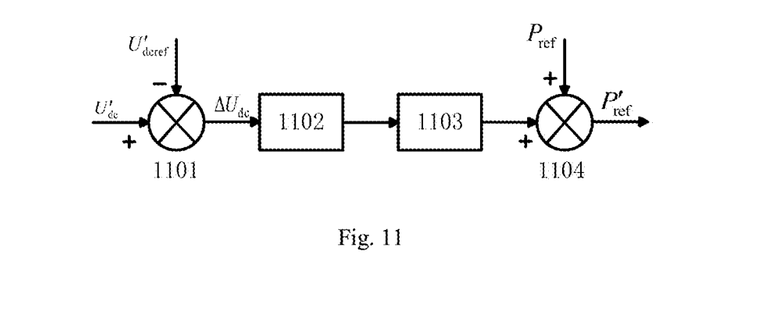
FIG. 11 is a logic diagram of generating the present reference power signal with the voltage-power droop control model according to an embodiment of the present invention.

FIG. 11 is a logic diagram of generating the present reference power signal with the voltage-power droop control model according to the embodiment.

As shown in FIG. 11, in this embodiment of the present method, a third subtractor 1101 is used to calculate a difference between the second DC voltage U'$_{dc}$ and a preset reference DC voltage signal U'$_{dcref}$ of the energy storage adapter, thereby generating a third voltage deviation signal ΔU$_{dc}$. That is:

$$\Delta U_{dc} = U'_{dcref} - U'_{dc} \quad (8)$$

Subsequently, in the present method a logic module 1102 and a PID control module 1103 are used to generate, based on said third voltage deviation signal ΔU$_{dc}$, an output power deviation signal, which is transmitted to the second adder 1104, so that the output power deviation signal is summed with the preset reference output power signal P$_{ref}$ of the DC micro-grid adapter by the second adder 1104, thus obtaining the present reference power signal P'$_{ref}$.

In this embodiment, if said second DC voltage U'$_{dc}$ is within the preset DC voltage allowable range [U$_1$, U$_2$] of the energy storage adapter, the signal outputted by the logic module 1102 is zero. However, if said second DC voltage U'$_{dc}$ is out of the preset DC voltage allowable range [U$_1$, U$_2$] of the energy storage adapter, the signal outputted by the logic module 1102 is its input signal, i.e., the third voltage deviation signal ΔU$_{dc}$.

In this embodiment, the transfer function of the PID control module 1103 can be expressed as:

$$G(s) = K + \frac{K_i}{s} + K_d s \quad (9)$$

In this case, for the voltage-power droop control model provided in this embodiment, there exists:

$$P'_{ref} = \begin{cases} \left(K + \frac{K_i}{s} + K_d s\right)(U'_{dcref} - U'_{dc}) + P_{ref} & U'_{dc} \leq U_1 \\ P_{ref} & U_1 < U'_{dc} < U_2 \\ \left(K + \frac{K_i}{s} + K_d s\right)(U'_{dcref} - U'_{dc}) + P_{ref} & U_2 \leq U'_{dc} \end{cases} \quad (10)$$

wherein: P'$_{ref}$ represents the present reference power signal; K, K$_i$, and K$_d$ represent the proportional coefficient, integral coefficient, and differential coefficient of the PID controller, respectively; U'$_{dc}$ represents the second DC voltage; U'$_{dcref}$ represents the preset reference DC voltage of the energy storage adapter; P$_{ref}$ represents the preset reference output power of the energy storage adapter; and U$_1$ and U$_2$ represent the minimum and maximum values of the preset DC voltage range of the energy storage adapter, respectively.

After the present reference power signal P'$_{ref}$ is obtained, in this method a dual closed-loop control logic consisting of a voltage outer loop and a current inner loop is used to generate a second control signal based on the present reference power signal. In this embodiment, said second control signal preferably includes a duty cycle signal for the energy storage adapter. According to the present method, the duty cycle signal for the energy storage adapter is preferably generated based on the present reference power signal with the dual closed-loop control logic consisting of a voltage outer loop and a current inner loop. The dual closed-loop control logic is known in the field, thus the details of which will not be discussed here.

In this embodiment, when the voltage-power droop control model is used to control the energy storage adapter according to the present method, the output power of the energy storage device is preferably controlled. That is, the energy storage adapter is an adapter for the energy storage device in the AC/DC distribution system.

Figure 12:
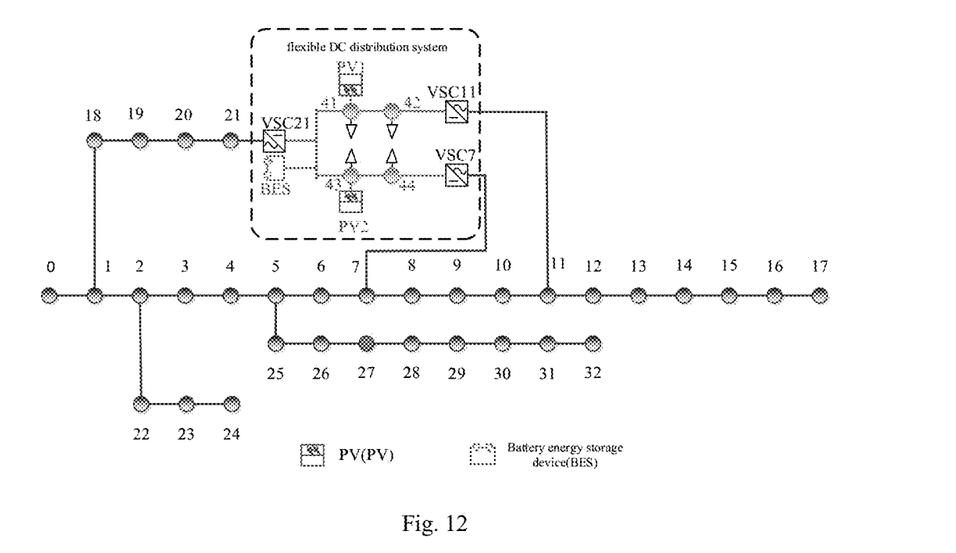
FIG. 12 shows an improved IEEE 33-node distribution system model according to an embodiment of the present invention.

FIG. 12 shows an improved IEEE 33-node distribution system model established on simulation software. The DC distribution system is integrated with photovoltaic power generation devices, battery energy storage devices, and AC/DC loads. The DC voltage of the system is 20 kV. The photovoltaic power generation devices each have a rated capacity of 2MW, and an actual active power of 1.8 MW. The battery energy storage devices each have a capacity of 2 MWh. The DC load power is 0.5 MW. For the simulation conditions, the DC load increases by 40% at 1 s, and the simulation ends at 12 s.

Figure 13:
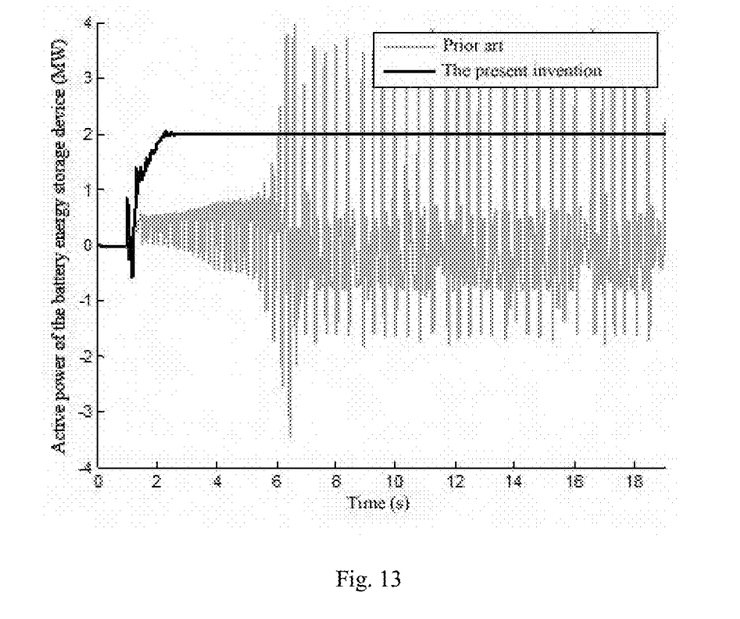
FIGS. 13 to 16 schematically show simulation results according to an embodiment of the present invention, respectively.

It can be known from FIG. 13 that the adjustment on the active power output by the battery energy storage device under the conventional voltage cooperative control method is relatively small, which means the capability of its power adjustment cannot be fully exerted. However, according to the novel AC/DC distribution method for improving dynamic performance and steady-state performance of the flexible DC distribution system provided by the present invention, the adjustment on the active power output by the battery energy storage device is relatively large, which means the capability of its power adjustment can be fully exerted.

Figure 14:
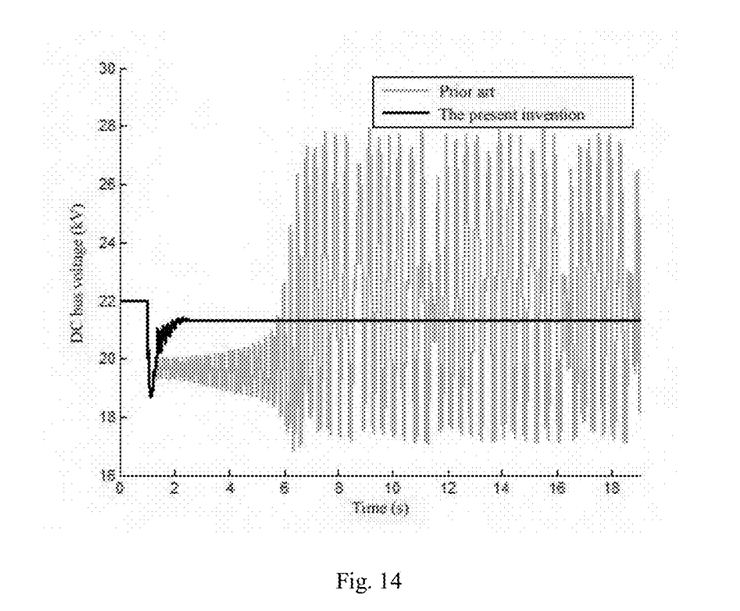

It can be seen from FIG. 14 that the dynamic adjustment procedure of the system under the conventional voltage cooperative control method is relatively long, which means a weak system damping. After the transient adjustment procedure ends, the steady-state DC voltage deviates far from the set value, which means the power imbalance of the DC distribution system has not been effectively suppressed. However, according to the novel AC/DC distribution method for improving dynamic performance and steady-state performance of the flexible DC distribution system provided by the present invention, the dynamic adjustment procedure of the system is relatively short, which means a strong system damping. After the transient adjustment procedure ends, the steady-state DC voltage is close to the set value, which means the power imbalance of the DC distribution system has been effectively suppressed.

Figure 15:
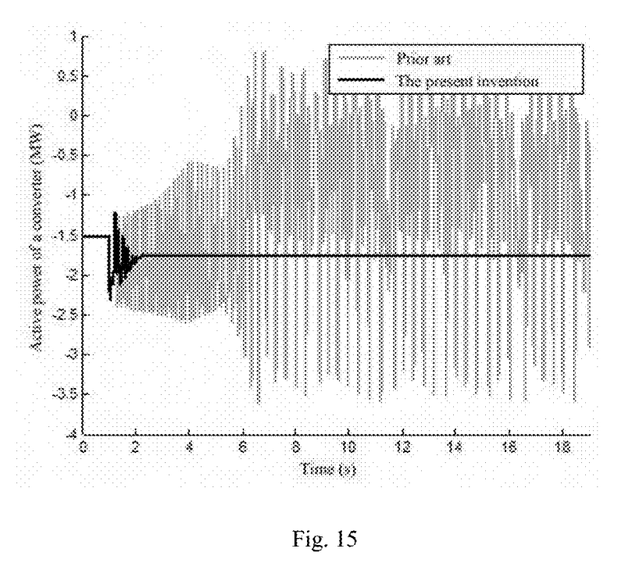

It can be known from FIG. 15 that the operating point of a certain converter under the conventional voltage cooperative control method has changed greatly, which means a greatly changing instantaneous exchange power between the AC/DC systems. However, according to the novel AC/DC distribution method for improving dynamic performance and steady-state performance of the flexible DC distribution system provided by the present invention, the operating point of a certain converter changes insignificantly, which means a barely changing instantaneous exchange power between the AC/DC systems.

Figure 16:
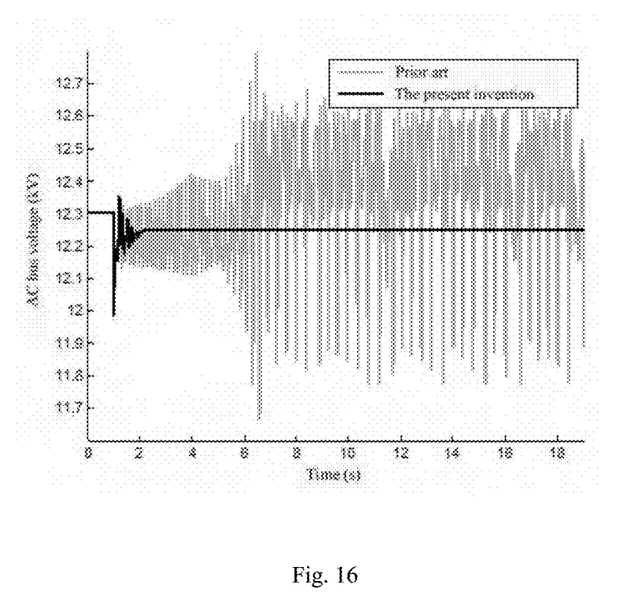

It can be known from FIG. 16 that the voltage level of the AC system under the conventional voltage cooperative control method has a relatively large change. However, according to the voltage cooperative control method of the AC/DC distribution system with integration of energy storage provided by the present invention, the voltage level of the AC system has a relatively small change.

It can be seen from the foregoing that the AC/DC distribution method for the AC/DC distribution system with integration of energy storage according to the present invention is a control method based on hierarchical control strategy, which includes a primary voltage regulation and a secondary voltage regulation. The primary voltage regulation is undertaken by flexible devices under the voltage-current droop control mode, so as to achieve the following purposes. On the one hand, various flexible devices are coordinated according to voltage-current droop control characteristics in a balanced manner, thus fully playing individual voltage regulation capabilities to enhance the DC voltage controllability. On the other hand, the burden on the voltage regulation of the battery energy storage device can be relieved, thus suppressing frequent charging/discharging of the battery energy storage device to prolong the service life thereof.

Through analysis it is found that although the primary voltage regulation can provide real time response, the output of various flexible devices is insufficient to meet the requirement on the system power when the power imbalance of the DC distribution system is harsh, and in the meantime the DC voltage suffers a large fluctuation. In this case, it is necessary to use the battery energy storage device to perform the secondary voltage regulation on the system, in order to compensate for the power imbalance of the flexible DC distribution system to adjust the DC voltage to the allowable range.

Specifically, in an embodiment, the secondary voltage regulation is performed by the battery energy storage device under the voltage-power droop control mode. The secondary voltage regulation can better meet the requirements on the power of the flexible DC distribution system, so that the DC voltage can be restored to a stable working area after the secondary voltage regulation. At the same time, the secondary voltage regulation can also enhance the system damping, increase the dynamic adjustment speed of the system, and improve stability of the system. In addition, the secondary voltage regulation can also reduce the change in the exchanging power of the AC/DC distribution system before and after disturbance, that is, reduce the impact of integration of the flexible DC distribution system on the AC distribution system.

It should be understood that the embodiments according to the present invention are not limited to the specific structures or processing steps as disclosed herein, but should be extended to equivalent replacements of these features as understood by those ordinarily skilled in the art. It should also be understood that terminology used herein is for the purpose of description of specific embodiments only, but not for restriction.

The phrase "one embodiment" or "an embodiment" as mentioned in the specification means that a particular feature, structure, or characteristic described in connection with the embodiment is included in at least one embodiment according to the present invention. Thus, the phrase "one embodiment" or "an embodiment" in various places throughout the specification does not necessarily indicate the same embodiment.

Although the above embodiments are used to illustrate the principle of the present invention in one or more applications, it will be obvious to those skilled in the art that without departing from the principles and ideas of the present invention, various modifications to the form, usage and implementation thereof can be made without creative labor. Accordingly, the scope of protection of the present invention is defined by the appended claims.

The invention claimed is:

1. A voltage coordinated control method for an AC/DC distribution system with integration of energy storage, including steps of:

S01, acquiring an actual voltage and an actual current at a DC-side of at least one converter of the AC/DC distribution system, so as to obtain a first DC voltage and a first DC current;

S02, generating, based on the first DC voltage and the first DC current, a present reference current signal for the converter according to a voltage-current droop control model, and generating a first control signal based on said present reference current signal to control an output state of the converter; and S03, acquiring an actual voltage at a DC-side of an energy storage adapter in the AC/DC distribution system to obtain a second DC voltage, generating a present reference power signal for the energy storage adapter based on said second DC voltage according to a voltage-power droop control model, and generating a second control signal based on said present reference power signal to control an output state of the energy storage adapter.

2. The method according to claim 1, wherein the step of generating a present reference current signal according to a voltage-current droop control model comprises:

determining whether the first DC current is within a preset allowable range for an output current of the converter, and if so, generating a first voltage deviation signal based on the first DC voltage and a first preset reference voltage signal;

performing proportional conversion on the first voltage deviation signal to obtain a second voltage deviation signal; and updating a preset reference current signal for the converter based on said second deviation signal to obtain said present reference current signal.

3. The method according to claim 2, wherein in a case that the first DC current is greater than or equal to a maximum value of the preset allowable range for the output current of the converter, the method further comprises using said maximum value of the preset allowable range for the output current of the converter as said present reference current signal; and in a case that the first DC current is less than or equal to a minimum value of the preset allowable range for the output current of the converter, the method further comprises using said minimum value of the preset allowable range for the output current of the converter as said present reference current signal.

4. The method according to claim 3, wherein in the voltage-current droop control model there exists:

$$I'_{dcref} = \begin{cases} I_{dcmin} & I_{dc} \leq I_{dcmin} \\ I_{dcref} + k(U_{dcref} - U_{dc}) & I_{dcmin} < I_{dc} < I_{dcmax} \\ I_{dcmax} & I_{dc} \geq I_{dcmax}, \end{cases}$$

wherein: $I'_{dcref}$ indicates the present reference current signal; $I_{dcmax}$ and $I_{dcmin}$ indicate the maximum and minimum values of the preset allowable range for the output current of the converter, respectively; $I_{dcref}$ indicates the preset reference current signal of the converter; k indicates a proportional coefficient of a proportional controller; $U_{dc}$ indicates the first DC voltage; $I_{dc}$ represents the first DC current; and $U_{dcref}$ represents the first preset reference voltage signal.

5. The method according to claim 1, wherein the step of generating a present reference power signal according to the voltage-power droop control model comprises:

determining whether the second DC voltage is within a preset DC voltage allowable range of the energy storage adapter, and if so, using a preset reference output power signal for the energy storage adapter as the present reference power signal.

6. The method according to claim 5, wherein in a case that the second DC voltage is out of the preset DC voltage allowable range of the energy storage adapter, then the method further comprises generating a third voltage deviation signal based on the second DC voltage and a preset reference DC voltage signal of a DC micro-grid adapter;

generating an output power deviation signal based on said third voltage deviation signal with a PID controller; and updating the preset reference output power signal of the energy storage adapter based on said output power deviation signal to obtain the present reference power signal.

7. The method according to claim 6, wherein in the voltage-power droop control model, there exists:

$$P'_{ref} = \begin{cases} \left(K + \frac{K_i}{s} + K_d s\right)(U'_{dcref} - U'_{dc}) + P_{ref} & U'_{dc} \leq U_1 \\ P_{ref} & U_1 < U'_{dc} < U_2 \\ \left(K + \frac{K_i}{s} + K_d s\right)(U'_{dcref} - U'_{dc}) + P_{ref} & U_2 \leq U'_{dc}, \end{cases}$$

wherein: $P'_{ref}$ represents the present reference power signal; K, $K_i$, and $K_d$ represent a proportional coefficient, an integral coefficient, and a differential coefficient of the PID controller, respectively; $U'_{dc}$ represents the second DC voltage; $U'_{dcref}$ represents the preset reference DC voltage of the energy storage adapter; $P_{ref}$ represents the preset reference output power of the energy storage adapter; and $U_1$ and $U_2$ represent the minimum and maximum values of the preset DC voltage range of the energy storage adapter, respectively.

8. The method according to claim 1, wherein said second control signal includes a duty cycle signal for the energy storage adapter, and in S03 the duty cycle signal for the energy storage adapter is generated based on the present reference power signal with a dual closed-loop control logic consisting of a voltage outer loop and a current inner loop.

9. The method according to claim 1, wherein the first control signal includes a modulated signal for the converter, and in S02 the modulated signal for the converter is generated based on the present reference current signal with a dual closed-loop control logic consisting of a voltage outer loop and a current inner loop.

10. An AC/DC distribution system, comprising:

a plurality of converters, a DC end of each being connected with a DC distribution network bus and an AC end thereof being connected with an AC distribution network bus;

a plurality of adapters, one end of each being connected with the DC distribution network bus and the other end of each being connected with an adjustable power source; and an AC/DC distribution control device, which is connected to the converters and the adapters, and configured to control operation states of the converters and the adapters with the method according to claim 1.

* * * * *